(12) United States Patent
Loose, Sr.

(10) Patent No.: US 9,325,131 B2
(45) Date of Patent: Apr. 26, 2016

(54) ELECTRICAL RECEPTACLE OR SWITCH WITH FOLDABLE MOUNTING TABS

(71) Applicant: Michael D. Loose, Sr., Denver, PA (US)

(72) Inventor: Michael D. Loose, Sr., Denver, PA (US)

(73) Assignee: Michael D. Loose, Sr., Denver, PA (US)

(*) Notice: Subject to any disclaimer, the term of this patent is extended or adjusted under 35 U.S.C. 154(b) by 111 days.

(21) Appl. No.: 14/200,621

(22) Filed: Mar. 7, 2014

(65) Prior Publication Data

US 2015/0255937 A1    Sep. 10, 2015

(51) Int. Cl.
| | |
|---|---|
| *H01R 13/66* | (2006.01) |
| *H01R 25/00* | (2006.01) |
| *H02G 3/12* | (2006.01) |
| *H01R 24/78* | (2011.01) |

(52) U.S. Cl.
CPC ............. *H01R 25/006* (2013.01); *H02G 3/121* (2013.01); *H01R 24/78* (2013.01)

(58) Field of Classification Search
CPC ...... H01R 25/006; H01R 24/78; H01R 24/76; H02G 3/14; H02G 3/121
USPC .................................. 439/106–108, 535–539
See application file for complete search history.

(56) References Cited

U.S. PATENT DOCUMENTS

| | | | | | |
|---|---|---|---|---|---|
| 3,718,894 | A | * | 2/1973 | Schumacher | H01R 27/00 439/689 |
| 4,836,793 | A | * | 6/1989 | Munroe | H01R 13/655 439/106 |
| 5,266,039 | A | * | 11/1993 | Boyer | H01R 13/648 439/107 |
| 7,192,289 | B2 | * | 3/2007 | Kowalski | H02G 3/00 439/106 |
| 7,323,638 | B1 | * | 1/2008 | Radosavljevic | H01R 13/447 174/53 |

* cited by examiner

*Primary Examiner* — Khiem Nguyen

(57) ABSTRACT

An electrical assembly for a building power circuit includes an electrical component having front and rear ends, a centerline extending generally between the front and rear ends, two opposing side ends, and a front surface extending between the two side ends, the component including a switch or/and a socket. Two mounting tabs each have an inner end connected, preferably pivotally, with a separate component side end, an opposing outer end connectable with a mounting box, and a front surface extending between the inner and outer ends. At least one mounting tab is movable toward the centerline between a first position, at which the mounting tab front surface extends generally parallel with respect to the component front surface, and a second position at which the tab front surface extends generally perpendicular with respect to the component front surface, such that the component is disposable within the cavity of a mounting box.

20 Claims, 9 Drawing Sheets

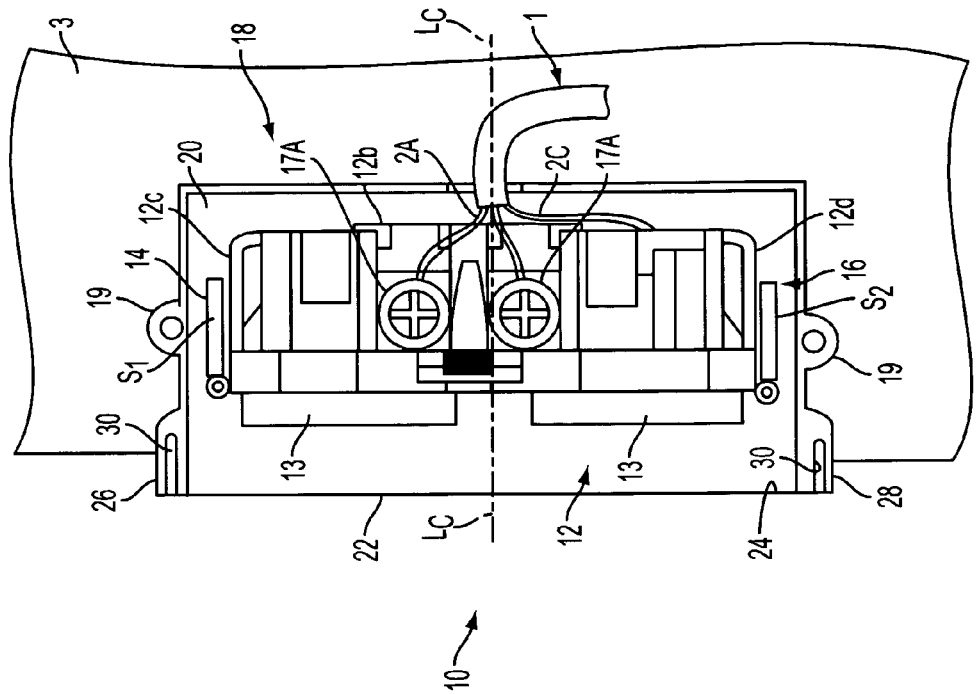
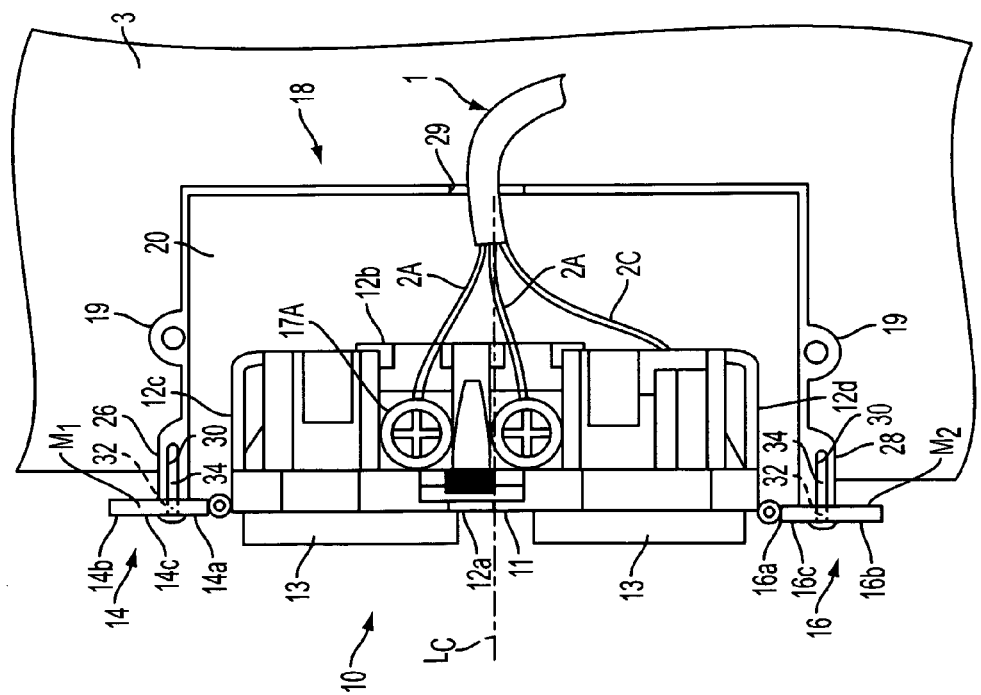

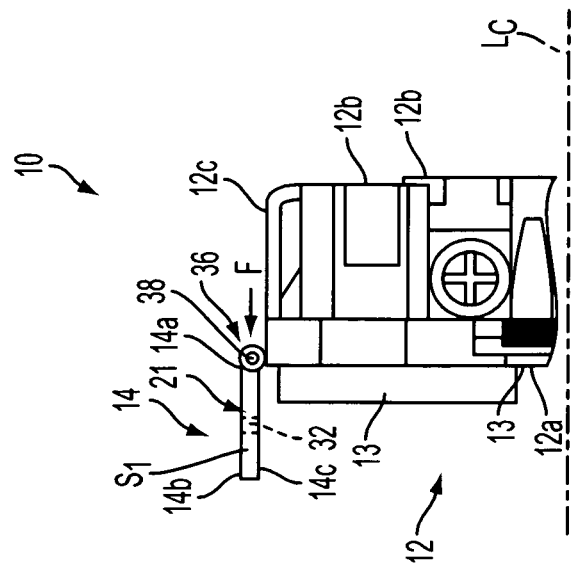
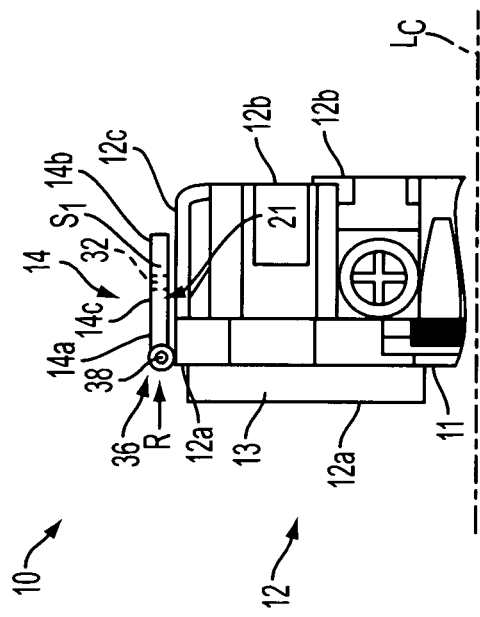

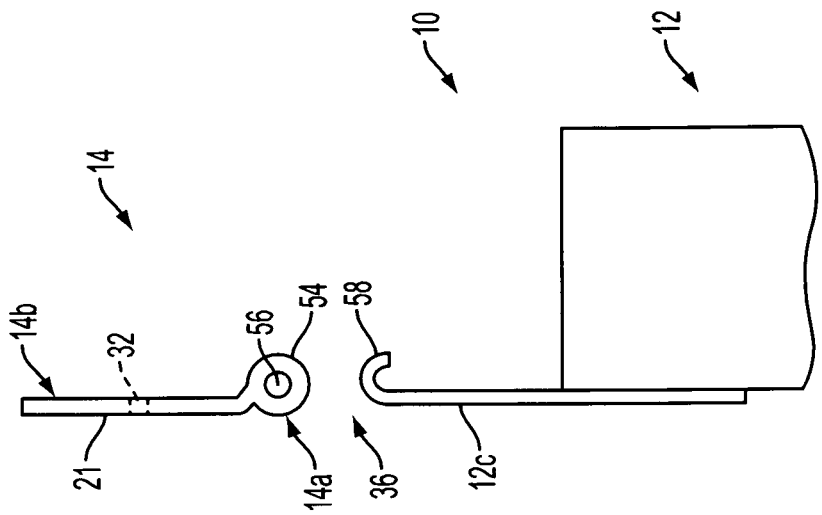
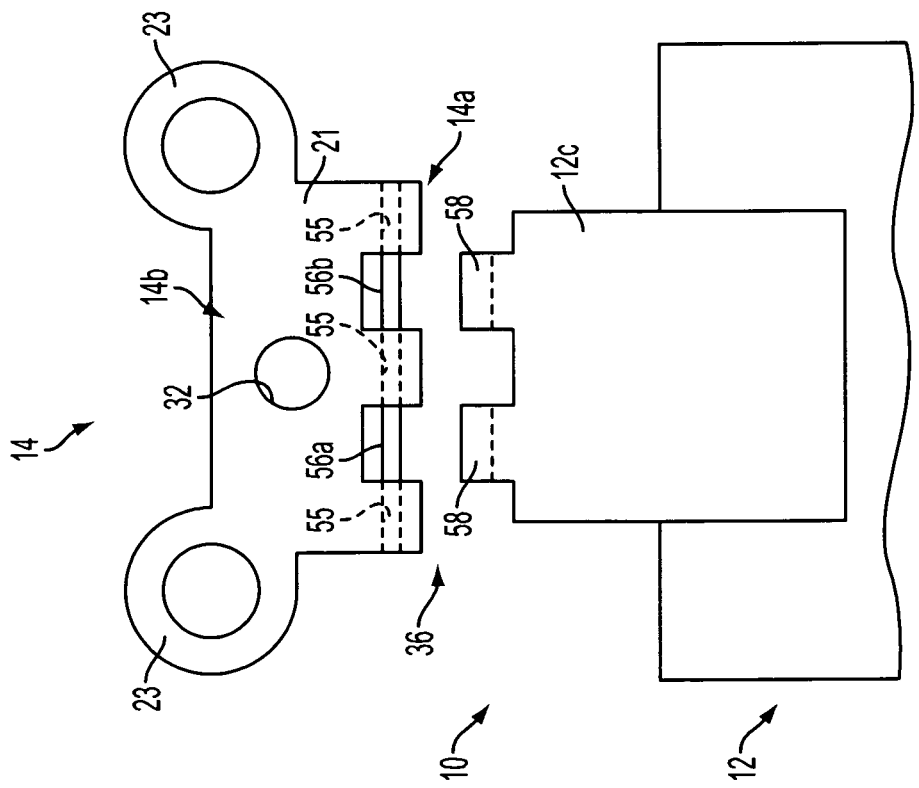

ELECTRICAL RECEPTACLE OR SWITCH WITH FOLDABLE MOUNTING TABS

BACKGROUND OF THE INVENTION

The present invention relates to electric power circuits, and more specifically to receptacles and switches used in building power systems.

Electrical receptacles and switches used in building electric power circuits are well known. Typically, such electronic components are electrically connected with a building power circuit by attaching the particular component with a housing or "mounting box" having openings to receive wires of the power circuit. In a new building construction, a mounting box is attached to a beam or "stud" of a building frame wherever it is desired to place an electric switch and/or power outlet. Then, wires of the power circuit are routed to the box and the unconnected ends of the wires are left within the box.

Generally, the component (switch and/or outlet) cannot be electrically connected into the circuit until after the walls (e.g., drywall panels) are installed as the component has mounting ears or tabs that extend beyond the sides of the box. As such, a hole is cut in a wall panel or sheet that is sized to fit the outer perimeter of the box, whether single gang or multi-gang (e.g., 2-gang, 3-gang, etc.), and then the panel is installed such that a front end of the box is generally flush with the wall outer surface. At this point, an electrician must come and connect the power circuit wires with the component and the component may then be fastened to the box.

SUMMARY OF THE INVENTION

In one aspect, the present invention is an electrical assembly for a building power circuit. The assembly comprises an electrical component having two opposing side ends, the component including at least one of a socket and a switch. Two mounting tabs each have an inner end pivotally connected with a separate one of the two component side ends and an opposing outer end configured to connect with a mounting box.

In another aspect, the present invention is again an electrical assembly for a building power circuit. The assembly comprises a housing having an interior cavity, an end with an opening extending into the cavity, and a pair of mounting portions adjacent to the opening. An electrical component has front and rear ends, a centerline extending generally between the front and rear ends, and two opposing side ends, the component including at least one of a socket and a switch. Two mounting tabs are each connected with a separate one of the two component side ends and are each connectable with a separate one of the housing mounting portions to attach the component to the housing, such that the component extends generally across the opening. At least one of the two tabs is movably coupled with the component so as to be displaceable generally toward the component centerline such that the component is disposeable within the cavity when the component is unattached from the housing.

In a further aspect, the present invention is yet again an electrical assembly for a building power circuit. The assembly comprises a housing having an interior cavity, an open end with an opening extending into the cavity and a pair of mounting portions adjacent to the opening. An electrical component has a center and two opposing ends, the component including at least one of an electric socket and a switch. Two mounting tabs are each pivotally connected with a separate one of the two component ends and are each connectable with a separate one of the two housing mounting portions to attach the component to the housing. Each tab is pivotable generally toward the component center such that substantially the entire component is disposeable within the housing cavity when the component is unattached from the housing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is a side cross-sectional view through a mounting box, showing the electrical assembly in a mounted position on a mounting box with exterior mounting portions;

FIG. 3 is another view of the assembly of FIG. 2, showing the assembly with mounting tabs in storage positions and located within a cavity of the mounting box;

FIG. 6 is an enlarged, broken-away side view of the electrical assembly, shown with a mounting tab in a rearward storage position;

FIG. 7 is an enlarged, broken-away side view of the electrical assembly, shown with a mounting tab in a forward storage position;

FIGS. 15A and 15B, collectively FIG. 15, are front and side views, respectively, of a mounting tab and component end, showing a hook and pin connection.

DETAILED DESCRIPTION OF THE INVENTION

Figure 1:
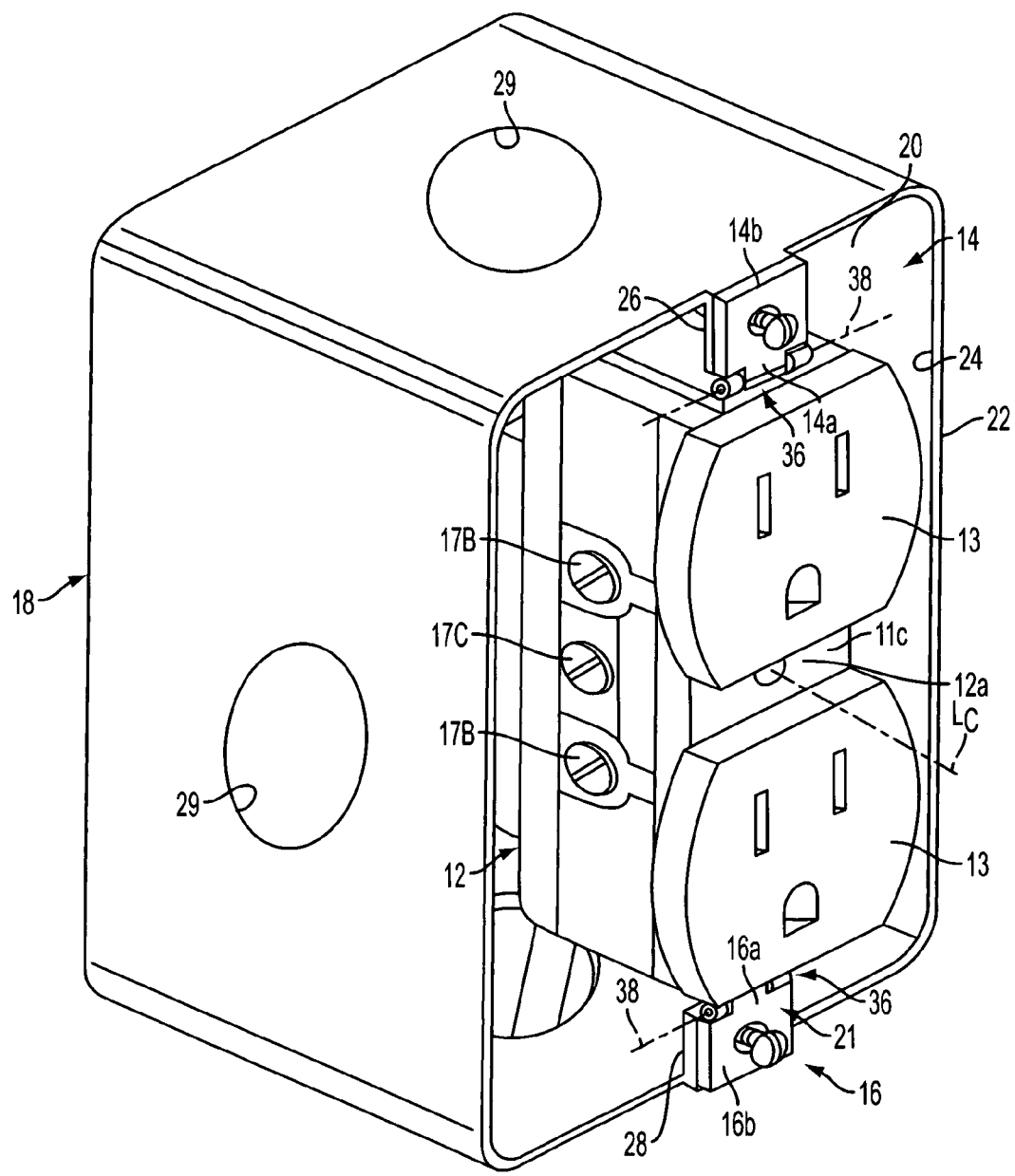
FIG. 1 is a perspective view of an electrical assembly in accordance with the present invention, including a mounting box with interior mounting portions.
Figure 4:
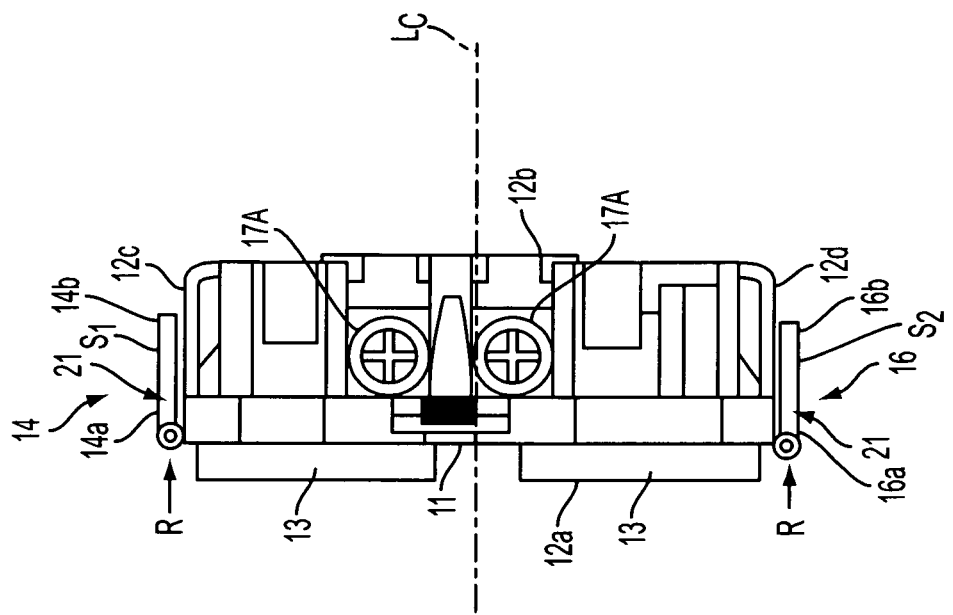
FIG. 4 is a side view of the electrical assembly, shown with two mounting tabs each located in a mounting position.

Certain terminology is used in the following description for convenience only and is not limiting. The words "right", "left", "front", "rear", "forward", "rearward", "top" and "bottom" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 an electrical assembly 10 for a building power circuit 1. The assembly 10 basically comprises an electrical component 12 and two mounting tabs 14, 16 connected with the component 12, and may also include a "mounting box" or housing 18 to which the component 12 is attached, as shown in FIGS. 1-3. The electrical component 12 has front and rear ends 12a, 12b, a centerline $L_C$ extending between the two ends 12a, 12b, two opposing side ends 12c, 12d and a front surface 11 extending generally between the side ends 12c, 12d, the centerline $L_C$ being at least generally perpendicular to the front surface 11. The component 12 includes at least one electrical "receptacle" or socket 13 or/and an electrical switch 15 disposed on the front end 12a, and preferably includes at least three (most preferably three pairs of) terminals 17A, 17B, 17C for electrically connecting a separate wire 2A, 2B, 2C (i.e., hot, neutral and ground) of the power circuit 1 with the socket 13 or/and switch 15.

Preferably, each mounting tab 14, 16 has an inner end 14a, 16a, respectively, connected with a separate one of the two component side ends 12c, 12d and an opposing outer end 14b, 16b configured to connect with a mounting box/housing 18. Although depicted in the drawing figures as a top side end 12c and a bottom side end 12d, the electrical component 12 may be arranged such that the mounting tabs 14, 16 are alternatively connected with left and right side ends of the electrical component 12. In any case, the mounting tabs 14, 16 each have a front surface 14c, 16c extending generally between the inner and outer ends 14a/14b, 16a/16b, respectively, and each is preferably formed as a generally flat plate 21 with two ears 23.

Further, the mounting box/housing 18 has an interior cavity 20, an end 22 with an opening 24 extending into the cavity 20, at least one pair of mounting portions 26, 28 adjacent to the opening 24, and at least one opening 29 for receiving electrical wires. The mounting box/housing 18 is preferably configured to be mounted to a beam or "stud" 3 of a building frame (not shown), such as for example, being formed with mounting flanges 19 each having a hole for receiving a nail or fastener to attach the housing 18 to the stud 3, as best shown in FIGS. 2 and 3. Also, the mounting box/housing 18 may be formed as a "single gang" box having a single pair of mounting portions 26, 28 for mounting one electrical component 12 (as depicted in the drawing figures) or may be formed as a "multi-gang" box (e.g., 2-gang, 3-gang) have two or more pairs of mounting portions 26, 28 for mounting two or more electrical components 12 (not shown).

As shown in each of FIGS. 1-15, at least one and preferably both mounting tab inner ends 14a, 16a are each movably coupled with the proximal component end 12c, 12d, respectively, so as to be displaceable generally toward, and alternatively away from, the component central axis $A_C$. Specifically, each mounting tab 14, 16 is preferably movable between a first, mounting position $M_1$, $M_2$ (indicated in FIGS. 2 and 4) and a second, "storage" position $S_1$, $S_2$ (indicated in FIGS. 3 and 5-7). As best shown in FIGS. 1, 2, 4 and 8-12, at the first, mounting position $M_1$ or $M_2$, the mounting tab front surface 14c, 16c extends generally parallel with respect to the component front surface 11 and each tab outer end 14b, 16b is located at a most distal position with respect to the component centerline $L_C$. As such, each mounting tab outer end 12b or 14b is thereby positioned to be attachable to a mounting portion 26, 28 of the housing 18, as described in further detail below.

Figure 5:
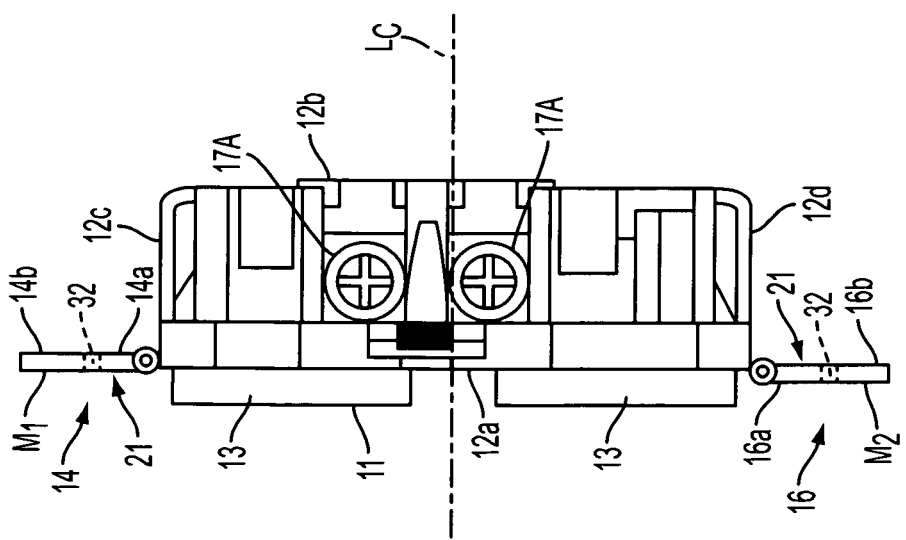
FIG. 5 is a side view of the electrical assembly, shown with two mounting tabs each located in a storage position.

In the second, storage position $S_1$ or $S_2$ as shown in FIGS. 3 and 5-7, each mounting tab front surface 14c, 16c extends generally perpendicular with respect to the component front surface 11, with each tab outer end 14b, 16b being located at a most proximal position with respect to the component centerline $L_C$. To locate the mounting tabs 14, 16 in the storage positions $S_1$, $S_2$, each tab 14, 16 is movable in a generally rearward direction R so as to extend generally rearwardly of the component front surface 11, as shown in FIGS. 3, 5 and 6, and/or is movable in a generally frontward direction F so as to extend generally frontwardly of the component front surface 11, as depicted in FIG. 7.

In any case, in the storage position $S_1$ or $S_2$, each mounting tab 14, 16 is located so as to reduce the overall height or profile of the electrical assembly 10. As such, the electrical component 12 is disposeable within the housing cavity 20 when the component 12 is unattached from the housing 18, as depicted in FIG. 3. By being storable within the mounting box/housing 18, the electrical assembly 12 provides the benefit of being able to "wire" or electrically connect the component 12 into a building power circuit prior to installation of walls (e.g., drywall) during a new building construction project, as discussed in greater detail below. Although both mounting tabs 14, 16 are preferably movably coupled with the electrical component 12, certain constructions of the electrical assembly 10 may have one movable tab (e.g., tab 14) and one "fixed" tab (e.g., tab 16) for use with mounting boxes/housings 18 with a sufficiently large cavity 20 to accommodate the assembly 10 with only a single "folded" tab 14 or 16.

Referring to FIGS. 1 and 2, each mounting tab 14, 16 is connectable with a separate one of the housing mounting portions 26, 28 to attach the electrical component 12 to the housing 18, such that the component 12 is mounted to the housing end 22 and extends generally across the opening 24. More specifically, each housing mounting portion 26, 28 preferably includes a hole 30, which may be threaded, self-threaded or otherwise formed, and each mounting tab 14, 16 includes a clearance hole 32 alignable with a separate one of the mounting portion holes 30, as best shown in FIG. 2. The housing mounting portions 26, 28 may be disposed generally within the housing cavity 20, as depicted in FIG. 1, or may be located on the housing exterior, as shown in FIGS. 2 and 3.

In either case, a threaded fastener 34 is insertable through each pair of aligned clearance hole 32 and threaded hole 30 to mount the electrical component 12 to the housing 18. However, the mounting tabs 14, 16 may be attachable to the housing 18 by any other appropriate means, such as for example, by a nail driven through each mounting tab 14, 16 and into the housing 18, by inserting a projection or stud on the housing 18 into a hole in the tab 14, 16, or vice-versa, by clamping the mounting tabs 14, 16 to the housing 18, etc. (no alternatives shown).

Referring now to FIGS. 8-15, the electrical assembly 10 preferably further comprises two hinges 36 each configured to pivotally connect a separate one of the two mounting tabs 14, 16 to a separate one of the two component ends 12c, 12d, respectively, such that each mounting tab 14, 16 is angularly displaceable about an axis 38 extending generally perpendicular with respect to the component centerline $L_C$ and generally parallel to the component front surface 11. In certain constructions as depicted in FIGS. 8-10 and 13, each hinge 36 includes at least one hinge knuckle 40 with a hole 42 attached to each component side end 12c, 12d (or tab inner end 14a, 14b) and at least two hinge knuckles 44, each with a hole 46, attached to each mounting tab inner end 14a, 16a (or component end 12c, 12d). The one more component knuckle holes 46 are generally alignable with the hole(s) 42 of the knuckle(s) 40 of the proximal mounting tab 14 or 16, and a hinge pin 48 extends through each set of aligned component and tab knuckle holes 42, 46 to pivotally couple the mounting tab 14, 16 with the proximal component end 12c, 12d.

Figure 14:
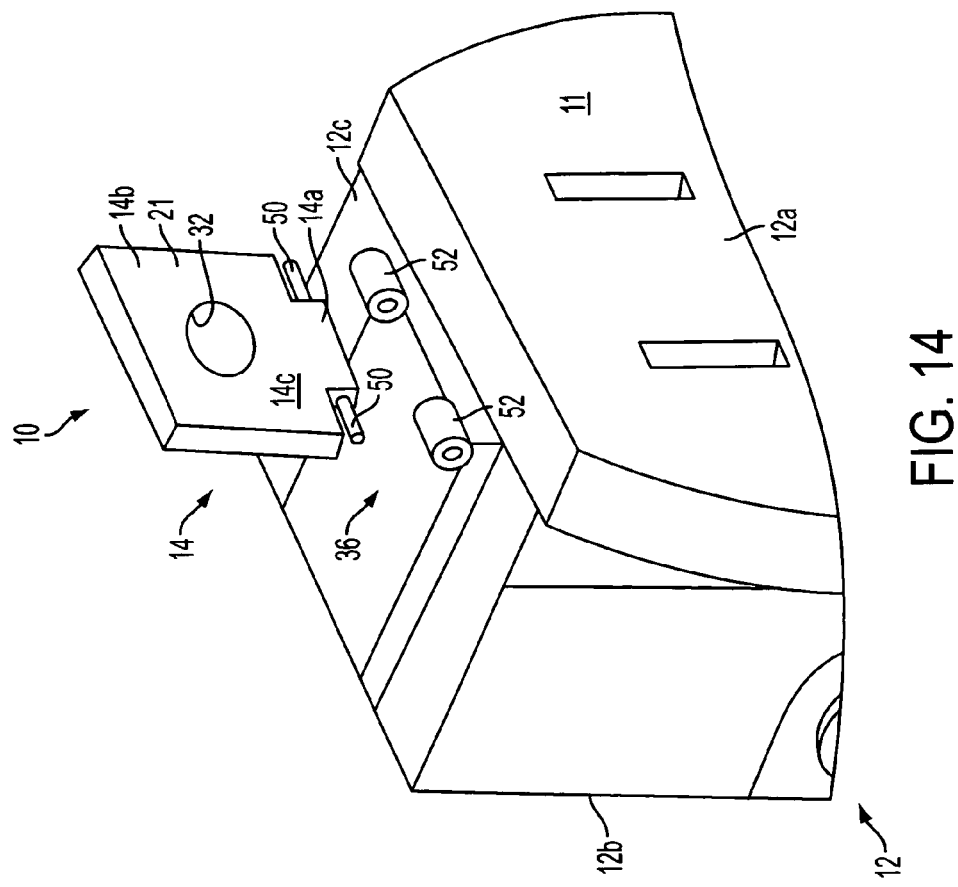
FIG. 14 is an enlarged, broken-away view of a mounting tab and component end, showing a trunnion and bearing connection.
Figure 13:
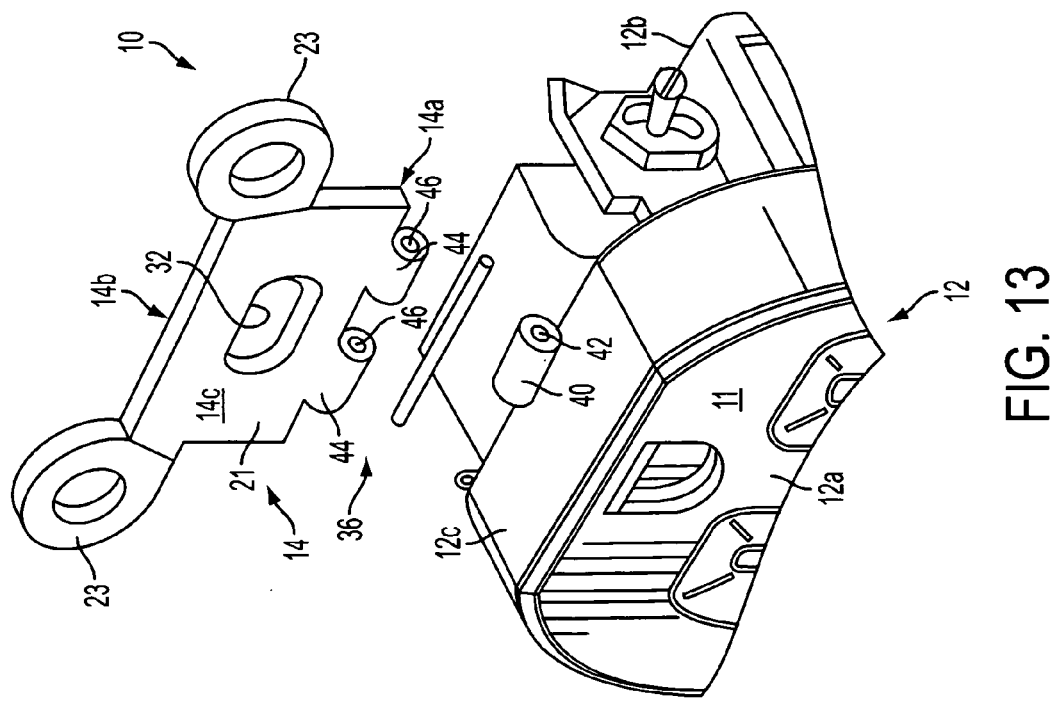
FIG. 13 is an enlarged, broken-away view of a mounting tab and component end, showing a hinge connection.

In an alternative construction of the electrical assembly 10 illustrated in FIGS. 1 and 14, each hinge 36 includes two outwardly and axially extending projections or trunnions 50 on each mounting tab inner end 14a, 16a (or component end 12c, 12d) and two axially spaced apart bearings 52 disposed on each of the component side ends 12c, 12d (or tab inner ends 14a, 16a). Each bearing 52 is configured to receive a separate one of the trunnions 50 so as to pivotally connect the mounting tab 14, 16 to the component side end 12c, 12d, respectively. As shown in FIG. 15, in another alternative construction of the electrical assembly 10, each hinge 36 includes at least two and preferably three knuckles 54 with holes 55 attached to each mounting tab inner end 14a, 16a (or component end 12c, 12d), with a pin 56 extending through the knuckle holes 55, and at least one and preferably two hooks 58 disposed on each component side end 12c, 12d (or tab end 14a, 16a). The hooks 58 are each configured to engage about a separate section 56a, 56b of the pin 56 so as to pivotally connect the tab 14 or 16 with the component 12.

Although three different structures for pivotally connecting each mounting tab 14, 16 with the proximal component side end 12c, 12d are shown and described herein, the present invention encompasses any other structure or construction for movably connecting the mounting tabs 14, 16 with the electrical component 12. For example, the mounting tab inner ends 14a, 16a and the component side ends 12c, 12d may be formed with interlocking stamped projections (none shown) capable of pivotally connecting the mounting tabs 14, 16 with the electrical component 12 without need for a pin(s). Further for example, each mounting tab inner end 14a, 16a may be slidably coupled with each component side end 12c, 12d, so as to be both pivotable and linearly displaceable, by means of a pair of axial projections (not shown) on each mounting tab end 14a, 16a that are disposed within a pair of generally parallel slotted openings (not shown) formed in each component end 12c, 12d. The scope of the present invention includes these and all other appropriate structures for at least pivotally connecting each mounting tab 14, 16 with the proximal end 12c, 12d of the electrical component 12.

Figure 9:
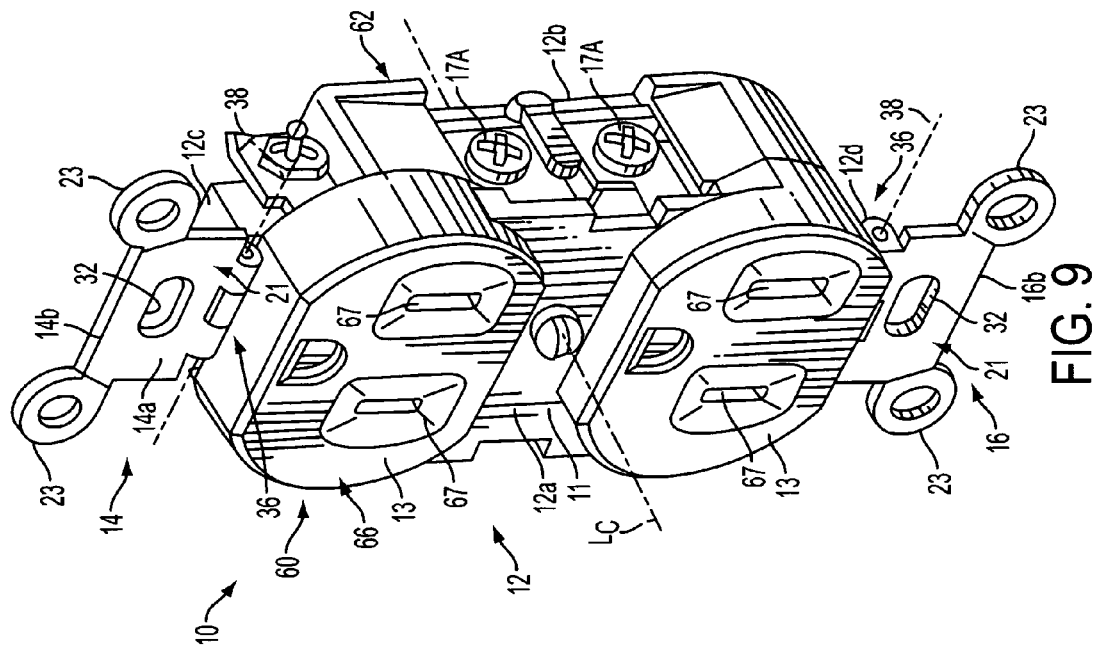
FIG. 9 is a perspective view of the electrical assembly of FIG. 8.
Figure 8:
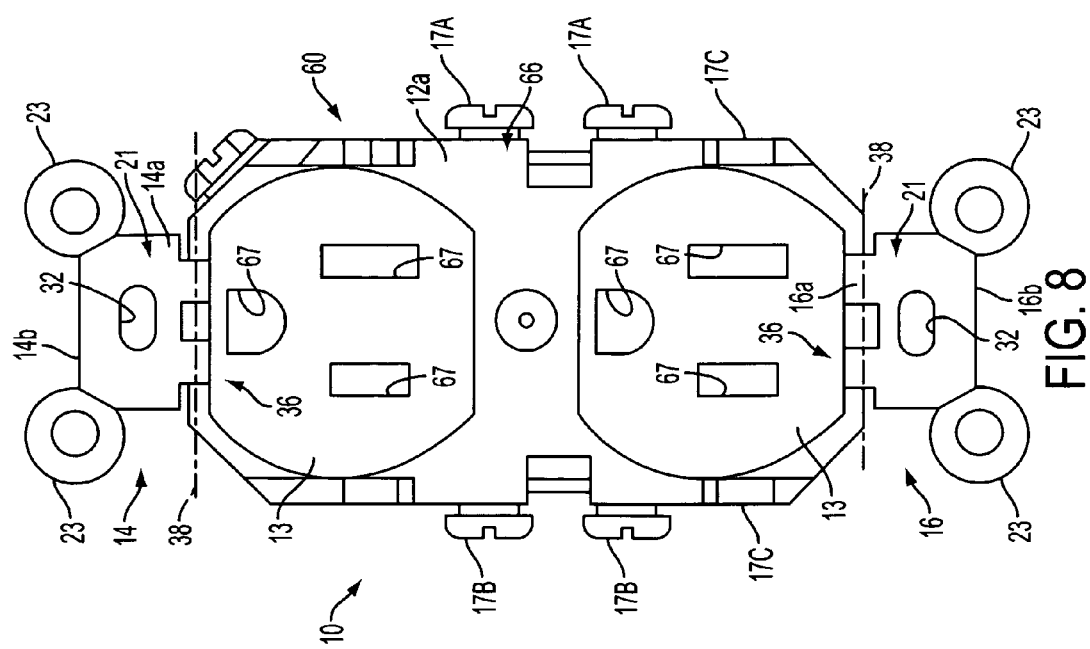
FIG. 8 is a front view of an electrical assembly having an electrical component having two electrical receptacles.
Figure 10:
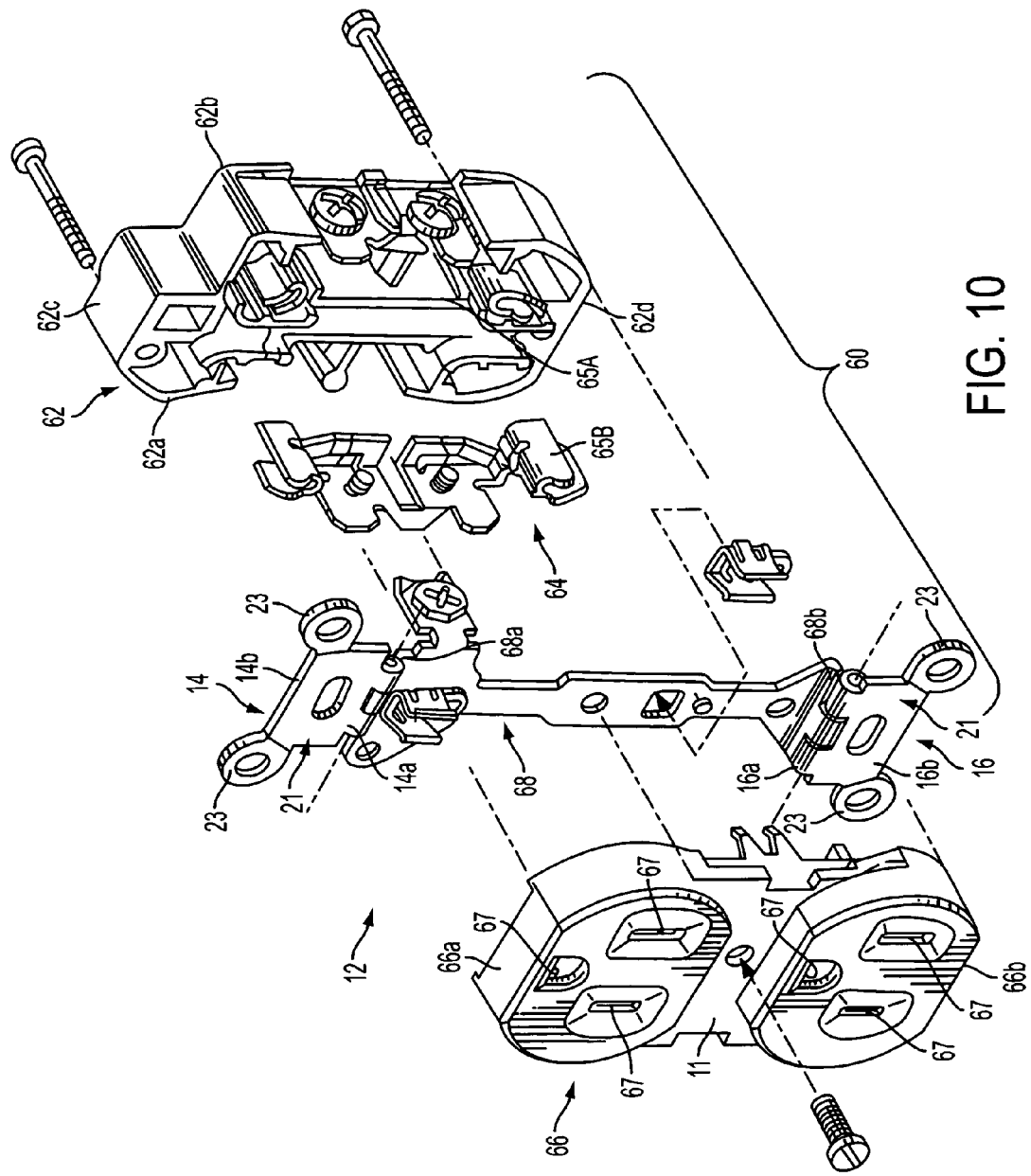
FIG. 10 is an exploded view of the electrical assembly of FIG. 9.

Referring now to FIGS. 8-10, in certain constructions, the electrical component 12 is similar to a conventional, commercially available receptacle 60 that includes two electric sockets 13 each adjacent to a separate one of the components side ends 12c, 12d and disposed on opposing sides of the centerline $L_C$. Such a receptacle 60 may include a base 62 having front and rear ends 62a, 62b and containing circuit elements 64, specifically a "hot" bus 65A and a neutral bus 65B, and a cover 66 attached to the base front end 62a. The cover 66 has prong openings 67, preferably six openings 67 for receiving a separate three-prong plug into each of the preferred two sockets 13, and provides the component front surface 11. An elongated, metallic ground strap 68 is disposed between the base 62 and cover 66 and has two opposing edges 68a, 68b disposed externally of the base 62 and each providing one of the two component side ends 12d, 12c. With this component structure, each one of the mounting tabs 14, 16 is preferably pivotally connected with a separate one of the ground strap edges 68a, 68b by means of a hinge 36 as described above. However, the mounting tabs 14, 16 may alternatively be connected with the top and bottom side ends 62c, 62d of the base 62 or the top and bottom side ends 64a, 64b of the cover 64.

Figure 11:
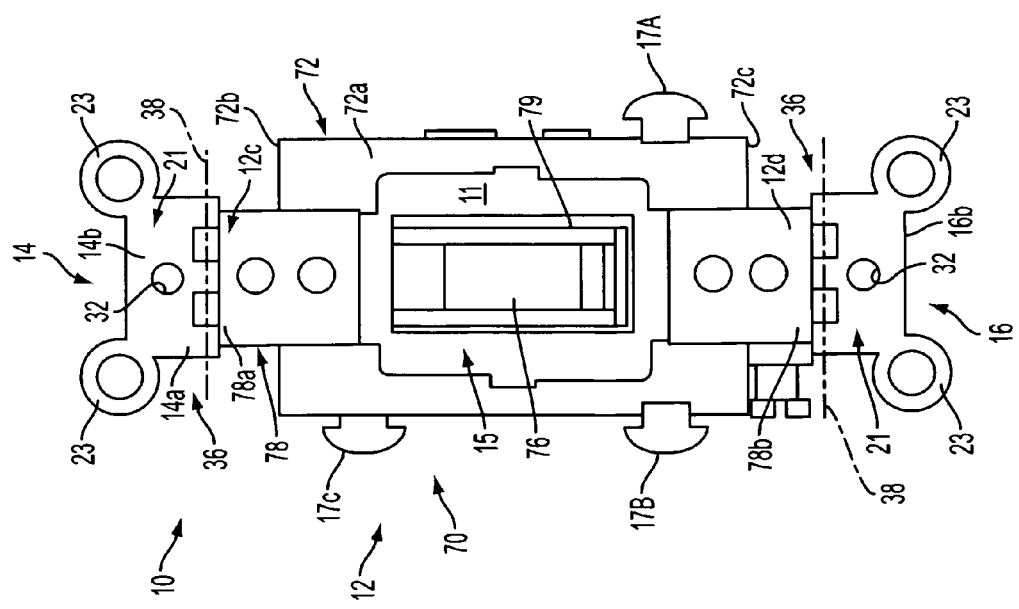
FIG. 11 is front view of another construction of the electrical assembly having an electrical component including a power switch.

Referring now to FIG. 11, in other constructions, the electrical component 12 is similar to a conventional, commercially available switch 70 that includes a base 72 with a front end 72a and a rear end (not shown) and having switch circuit elements (not shown) and a movable switch lever or toggle 76 for opening and closing the switch circuit elements. An elongated, metallic mounting strap 78 is a mounted to the base front end 72a and provides the component front surface 11. The strap 78 has a central opening 79 through which the toggle 76 extends and opposing edges 78a, 78b. With such a structure, each one of the mounting tabs 14, 16 is preferably pivotally connected with a separate one of the strap edges 76a, 76b by a separate hinge 36, but may alternatively connected with the base top and bottom side ends 72b, 72c.

Figure 12:
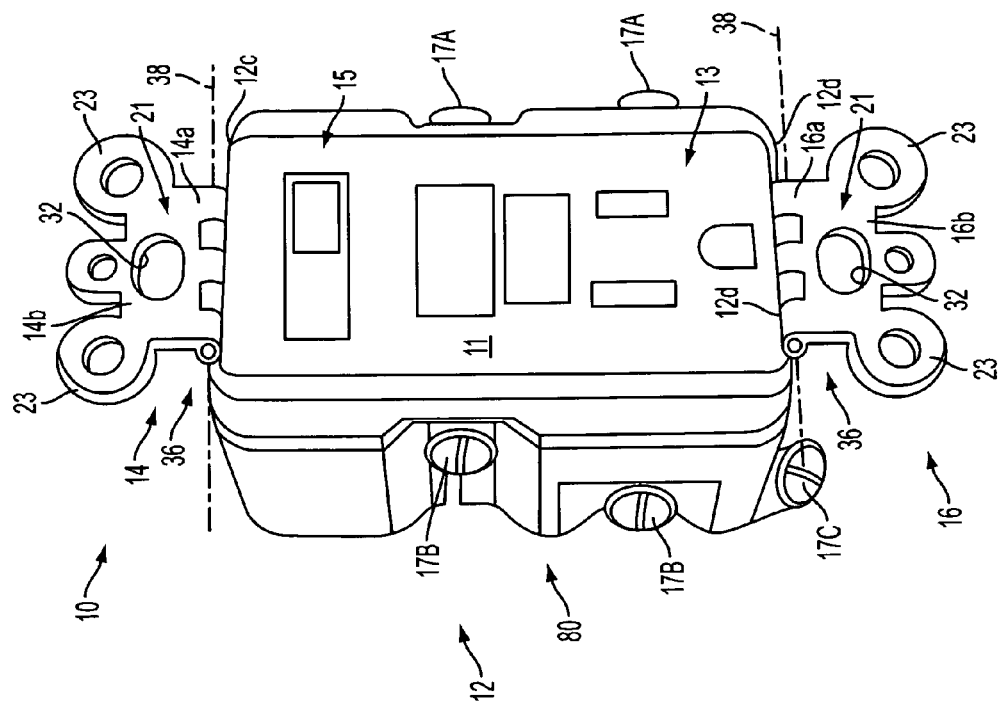
FIG. 12 is a perspective view of yet another construction of an electrical assembly having an electrical component having both a power switch and an electrical receptacle.

As shown FIG. 12, in yet other constructions, the electrical component 12 may be formed similarly to commercially available combination device 80 including both an electrical receptacle 13 and an electrical switch 15. Although three exemplary constructions 60, 70, 80 of the electrical component 12 are shown and described herein, the component 12 may be formed or constructed in any other appropriate manner which enables movable attachment of at least one of the mounting tabs 14, 16.

The electrical assembly 10 as described above may be utilized in a new building construction generally as follows. Wherever it is desired to locate an outlet or switch, a mounting box or housing 18 may be attached to a frame stud 3 by any appropriate means, and then wires 2 of the power circuit 1 routed to each box/housing 18. Then, an appropriate assembly 10, including one or more sockets 13 or switches 15, is positioned at each housing 18 and the wires 2A, 2B, 2C are attached to the component terminals 17A, 17B, 17C to electrically connect the component 12 into the power circuit 1. Thereafter, the circuit 1 and each electrical component 12 may be tested for proper functioning.

When the functioning of the power circuit 1 has been confirmed, the one or more movable mounting tabs 14 and/or 16 of each electrical assembly 10 are displaced to the tab storage position $S_1$, $S_2$ (if not already so located) and the electrical component 12 is then pushed into the storage cavity 20, as shown in FIG. 3. The wall and ceiling panels (e.g., drywall) with appropriate openings cut for the mounting boxes/housings 18 are then installed on the building frame. After all drywall panels are installed, mounting of the electrical components 12 may be completed by withdrawing each assembly 10 from the associated housing cavity 20, pivoting each movable mounting tab 14 and/or 16 to the mounting positions $M_1$, $M_2$, and then attaching each mounting tab outer end 14b, 16b to the housing mounting portions 26, 28, respectively, as shown in FIGS. 1 and 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. An electrical assembly for a building power circuit, the power circuit including at least mounting box having a cavity, the assembly comprising:

an electrical component having two opposing side ends, front and rear ends and a centerline extending generally between the front and rear ends, the component including at least one of an electrical socket configured to receive a power cord plug and an electrical switch; and two mounting tabs, each mounting tab having an inner end pivotally connected with a separate one of the two component side ends and an opposing outer end configured to connect with the mounting box, the two tabs being displaceable generally toward the component centerline such that the component is disposeable within the mounting box cavity when the tabs are unconnected with the mounting box.

2. The electrical assembly as recited in claim 1 wherein:
the electrical component further has a front surface extending generally between the two side ends; and
each mounting tab has a front surface extending generally between the tab inner and outer ends and is movable between a first position at which the mounting tab from surface extends generally parallel with respect to the component front surface and a second position at which the tab front surface extends generally perpendicular with respect to the component front surface.

3. The electrical assembly as recited in claim 1 wherein each mounting tab is angularly displaceable at least partially about a separate hinge axis, each hinge axis extending generally perpendicular with respect to the component centerline.

4. The electrical assembly as recited in claim 1 wherein the electrical component includes two electric sockets each adjacent to a separate one of the components ends and disposed on opposing sides of the centerline.

5. The electrical assembly as recited in claim 1 wherein the electrical component has at least one terminal for electrically connecting a wire with the at least one of a switch and a socket.

6. The electrical assembly as recited in claim 1 further comprising a base having front and rear ends, a cover attached to the base front end and providing the component front surface, and an elongated ground strap disposed between the base and the cover and having two opposing edges disposed externally of the base, each strap edge providing one of the two component ends, each one of the mounting tabs being pivotally connected with a separate one of the ground strap edges.

7. An electrical assembly for a building power circuit, the assembly comprising:
a housing having an interior cavity, an end with an opening extending into the cavity, and a pair of mounting portions adjacent to the opening;
an electrical component having front and rear ends, a centerline extending generally between the front and rear ends, and two opposing side ends, the component including at least one of an electrical socket configured to receive cord plug and an electrical switch; and
two mounting tabs each connected with a separate one of the two component side ends and connectable with a separate one of the housing mounting portions to attach the component to the housing such that the component extends generally across the opening, at least one of the two tabs being movably coupled with the component so as to be displaceable generally toward the component centerline such that the component is disposeable within the cavity when the component is unattached from the housing.

8. The electrical assembly as recited in claim 7 wherein each one of the two mounting tabs is movably coupled with a separate one of the electrical component ends such that both of the two tabs are displaceable generally toward the component centerline.

9. The electrical assembly as recited in claim 8 wherein each mounting tab has opposing inner and outer ends, each tab inner end being pivotally coupled with a separate one of the component ends and each tab outer end being attachable to a separate one of the housing mounting portions.

10. The electrical assembly as recited in claim 9 wherein the electrical component has a front surface extending between the two component side ends, each mounting tab has a front surface extending generally between the tab inner and outer ends, and each mounting tab is movable between a first position at which the mounting tab front surface extends generally parallel with respect to the component front surface and a second position at which the tab front surface extends generally perpendicular with respect to the component front surface.

11. The electrical assembly as recited in claim 9 further comprising two hinges each configured to pivotally connect a separate one of the two mounting tabs to a separate one of the two component side ends such that each mounting tab is angularly displaceable at least partially about a hinge axis extending generally perpendicular with respect to the component centerline.

12. The electrical assembly as recited in claim 7 wherein each housing mounting portion includes a hole and each mounting tab includes a clearance hole alignable with a separate one of the mounting portion threaded holes such that a threaded fastener is insertable through each pair of aligned tab hole and housing hole to mount the electrical component to the housing.

13. The electrical assembly as recited in claim 7 wherein the component includes two electric sockets each adjacent to a separate one of the components ends and disposed on opposing sides of the centerline.

14. The electrical assembly as recited in claim 7 wherein at least one of:
the housing is configured to be mounted to a beam of a building frame; and
the housing has at least one opening for receiving electrical wires and the electrical component has at least three terminals, each terminal being configured to receive a wire from a power circuit and to electrically connect the wire with the at least one of a socket and a switch.

15. An electrical assembly for a building power circuit, the assembly comprising:
a housing having an interior cavity, an open end with an opening extending into the cavity and a pair of mounting portions adjacent to the opening;
an electrical component having a center and two opposing ends, the component including at least one of an electric socket configured to receive a power cord plug and an electrical switch; and
two mounting tabs each pivotally connected with a separate one of the two component ends and connectable with a separate one of the two housing mounting portions to attach the component to the housing, each tab being pivotable generally toward the component center such that substantially the entire component is disposeable within the housing cavity when the component is unattached from the housing.

16. The electrical assembly as recited in claim 15 wherein each mounting tab has opposing inner and outer ends, each tab inner end being pivotally coupled with a separate one of the component ends and each tab outer end being attachable to a separate one of the housing mounting portions.

17. The electrical assembly as recited in claim 16 wherein the electrical component has a front surface extending between the two component ends, each mounting tab has a front surface extending generally between the tab inner and outer ends, and each mounting tab is movable between a first position at which the mounting tab front =face extends generally parallel with respect to the component front surface and a second position at which the tab front surface extends generally perpendicular with respect to the component front surface.

18. The electrical assembly as recited in claim 17 further comprising two hinges each configured to pivotally connect a separate one of the two mounting tabs to a separate one of the two component ends such that each mounting tab is angularly displaceable about an axis extending generally perpendicular with respect to the component centerline.

19. The electrical assembly as recited in claim 15 wherein each housing mounting portion includes a hole and each mounting tab includes a clearance hole alignable with a separate one of the mounting portion holes such that a threaded fastener is insertable through each pair of aligned tab hole and housing bole to mount the electrical component to the housing.

20. The electrical assembly as recited in claim 15 wherein the housing has at least one opening for receiving electrical wires and the electrical component has at least three terminals, each terminal being configured to receive a separate wire from a power circuit and to electrically connect the wire with the at least one of a socket and a switch.

\* \* \* \* \*